July 7, 1964 R. N. LAHDE 3,139,758
HIGH PRESSURE FLUID RATE GYROSCOPE
Filed Jan. 23, 1961
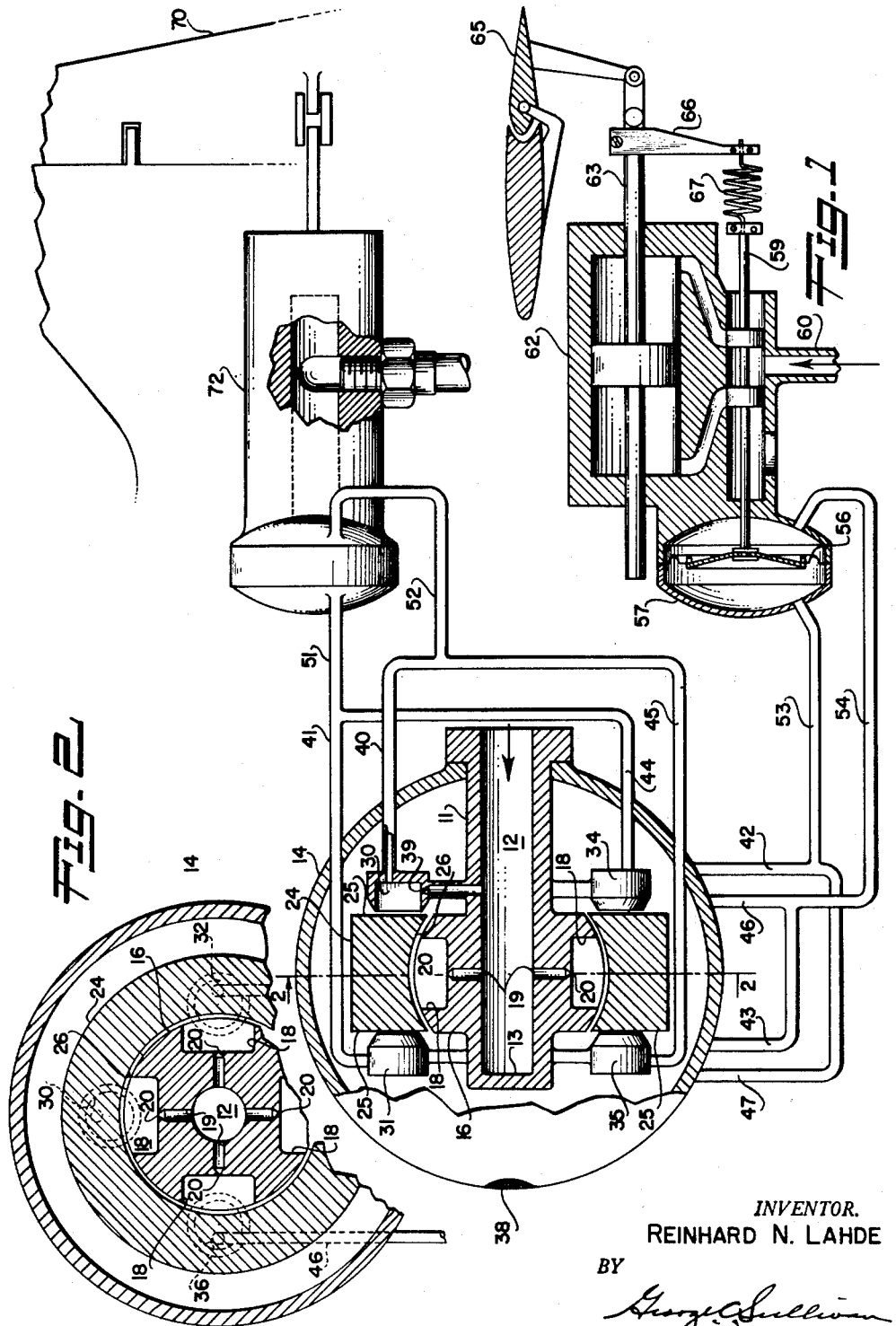
INVENTOR.
REINHARD N. LAHDE
BY
George C. Sullivan
Agent United States Patent Office 3,139,758
Patented July 7, 1964

3,139,758
HIGH PRESSURE FLUID RATE GYROSCOPE
Reinhard N. Lahde, Tarzana, Calif., assignor to Lockheed Aircraft Corporation, Burbank, Calif.
Filed Jan. 23, 1961, Ser. No. 84,022
3 Claims. (Cl. 74—5.6)

The present invention relates to a high pressure fluid driven gyroscope. More particularly it relates to a fluid pressure driven gyroscope which utilizes fluid pressure pick-off means to sense rates of angular motion.

The present invention contemplates a means of measuring angular rates of motion of a vehicle such as an aircraft or missile which uses a high pressure gas or fluid for operation and for signal pick-off. In most known rate gyros in existence today, the operation and the signal pick-off are electrical. Highly-sensitive rate gyros must have rotors which rotate at high speed. The ball bearings or other mechanical means which support a high-speed rotor have a limited life because of the high frictional forces exerted which limits the life and reliability of the gyroscope. The usual rate-gyro has a single rotor which measures angular rate about one axis only. Because of the mechanical bearing structure, the gyroscopes of today generally cannot withstand the high-temperature environments anticipated in missiles and high-speed aircraft.

It is an object of the present invention to provide a gyroscope of great simplicity. There is but one moving part, the rotor.

It is another object of the present invention to provide a gyroscope having a high degree of reliability. No mechanical bearings support the rotor. Rather, the bearings are a thin layer of high pressure fluid.

It is another object of the present invention to provide a gyroscope having a high degree of sensitivity about two mutually perpendicular axes at the same time. The rotor is supported on cushions of fluid and is so constructed so that it may move laterally on the cushion as well as about its axis.

It is another object of this invention to provide a gyroscope which will withstand high temperatures. There are no mechanical parts which contact each other physically so that high temperatures do not affect the frictional wear of the device. No lubricants are needed which may break down under the high temperatures.

It is another object of this invention to provide a gyroscope which may use an existing power source without necessity of converting other forms of energy into electrical energy before connecting it to the gyroscope. Bleed air from a turbine of a modern aircraft or exhaust pressure from a missile may be used to drive the gyroscope as well as provide signal pick-off medium.

Other objects and advantages of this invention will become apparent from the following detailed description taken together with the accompanying drawings submitted for the purposes of illustration and not intended to define the scope of the invention, reference being had for that purpose to the subjoined claims.

FIGURE 1 is a cutaway view of the gyroscope of the present invention as shown in use with an aircraft.

FIGURE 2 is a sectional view taken on lines 2—2 of FIGURE 1.

In FIGURE 1 the closed end hollow shaft 11 provides an opening 12 through which high-pressure fluid, either gas or liquid, is ducted to the interior of the spherical gyroscope housing 14 fixed to the shaft 11. Integral with shaft 11 is a spherical stator 16 having a plurality of pressure chambers 18 located about its peripheral surface of stator 16 in substantially a plane perpendicular to shaft 11. The high-pressure fluid entering the gyroscope housing through the opening 12 is bled through the small openings 19 to the orifices 20 to provide a reduced pressure in chambers 18.

Surrounding the stator 16 is a rotor 24 having parallel flat sides 25 and an inner periphery concave in shape complementary to the exterior spherical shape of stator 16. A small clearance is provided between the surface 26 and the exterior periphery of stator 16 to provide an escape for the pressure air chambers 18 and thus a cushion on which rotor 24 may rotate. Closely adjacent the parallel flat sides 25 of the rotor 24 are a plurality of pressure chambers 30–37 (chambers 33 and 37 opposite chambers 32 and 36 are not shown) receiving a reduced pressure from opening 12 through orifices 39. Driving force to the rotor 24 is supplied by a slight non-symmetry of the clearance distance between the rims of the chambers 30–37 and the rotor (not shown), or by use of a ratchet-like surface on the inner surface 26 of the rotor 24 as shown in U.S. Patent No. 2,086,896, to an Air Support Gyroscope which would accept pressure from the chambers 18 to cause the rotors to rotate in the desired direction. Port 38 in housing 14 provides for outward leakage of fluid.

In operation of the device, the pressure in the bleed chambers 18 and 30–37 is always small as compared to the supply pressure in the area 12; therefore the amount of fluid passing through each of the orifices 20 and 39 is practically constant and the pressure in the side bleed chambers 30–37 depends on the clearance between the rims of the chambers 30–37 and the part of the flat side 25 of the rotor 24 close to them. If this clearance becomes small then the pressure will rise in that particular chamber and the one diagonally opposite. This action will stabilize the position of the rotor 24 between the stationary bleed chambers 30–37 such that during operation of the device, the rotor 24 will float freely on cushions of gas. The pressure difference in the two opposite chambers 30 and 31 or 32 and 33 and so forth will be proportional to the force which the rotor 24 is exerting in the direction of the line connecting the centers of these two bleed chambers.

If the housing 14 is subjected to an angular rate which has a component perpendicular to the axis of shaft 11, then the rotor 24 is forced to follow this angular rotation through the action of the bleed chambers 30–37. During this process, the pressure difference between two opposite bleed chambers is proportional to the precession rate of the rotor and therefore to the angular rate. This pressure difference is picked off through the signal lines 40–47 which are connected to pressure chambers 30–37 respectively.

FIGURE 1 shows the means by which the signal lines 40–47 can be used to control an aircraft. As can be seen clearly from FIGURE 1, the signal lines 41 and 44 are joined in line 51 to conduct pressure to one side of a diaphragm which operates a valve spool. Signal lines 40 and 45 are joined in line 52 to conduct pressure to the other side of the diphragm. Line 53 connects signal lines 42 and 47 to one side of diaphragm 56 in a closed chamber 57. Line 54 connects signal lines 43 and 46 to the other side of diaphragm 56. Pressure differences established in the bleed pressure chambers 30–37 will be sensed through lines 42, 43, 46, 47, 53 and 54 to move the valve spool 59 which will valve high-pressure fluid through from source 60 to either side of the actuator 62 which through rod 63 operates the elevator 65. The arm 66 fixed to the rod 63 and spring 67 operates as a feed-back mechanism to balance the valve when the elevator 65 reaches the position to which it was commanded by the differential pressure between the lines 53 and 54. Likewise, the rudder 70 is controlled through a similar actuator 72. It should be understood that the lines or conduits connecting diagonally-spaced chambers should be small enough to restrict flow therebetween so that pressure differentials can build up. A positive approach would be to provide four chambers 57 with each chamber 30–37 connected solely to one side of the internal diaphragm of chambers 57.

The actuator means 62 and 72 along with their accessory components, shown here for purposes of example, conduct pressure differences to any number of devices or gages responsive to angular rates of movement.

The subject arrangement is basically symmetrical. The device is capable of simultaneously measuring angular rates around two mutually perpendicular axes which are perpendicular to the axis of the shaft 11. The weight-carrying fluid-cushion bearings support the center of gravity of the rotor and generate no disturbing torque. They provide to the rotor 24 the three degrees of freedom necessary for rotation and for the deflections connected with the angular rate sensing. The pressure bearings for pressure sensing are arranged symmetrically around the center of gravity and therefore the net pressure output signal is unaffected by lateral accelerations such as gravity components perpendicular to shaft 11.

Having disclosed the details of my invention, I claim the following combinations and their equivalents:

1. A gyroscope comprised of a stationary spherically shaped stator, a plurality of chambers spaced about and set into the spherical surface of the stator in substantially a single plane, an annular rotor surrounding the stator in spaced relation, overlying the chambers and having an inner periphery complementary to the exterior spherical surface of the stator, the rotor having flat sides approximately parallel to the plane in which the chambers on the surface of the spherical stator lie, a plurality of chambers open to the flat sides of the rotor and spaced slightly therefrom, a source of high-pressure fluid, a bleed-orifice for each one of the aforementioned chambers in the spherical stator and the chambers surrounding the flat faces of the rotor, means to conduct the high-pressure fluid to the orifices, a pressure pick-off means from each one of the chambers surrounding the flat sides of the rotor.

2. A gyroscope comprised of a stationary spherically shaped stator, a plurality of chambers opening outwardly and set into the spherical surface of the stator in substantially a single plane, an annular rotor having an inner periphery complementary to the exterior spherical surface of the stator, surrounding the stator in spaced relation and overlying the chambers, the rotor having flat sides approximately parallel to the plane in which the chambers on the surface of the spherical stator, lie, a plurality of stationary chambers open to the flat sides of the rotor and spaced slightly therefrom, a housing for the rotor and the stator and the aforementioned chambers, a source of high-pressure fluid, means to conduct the high-pressure fluid to the interior of the housing, an orifice opening to each aforementioned chamber, means to conduct the high-pressure fluid to each orifice, a small conduit from each of the chambers facing the flat sides of the rotor to the exterior of the housing by means of which the pressure of the individual chambers may be sensed and utilized.

3. A gyroscope comprised of a stationary stator having a spherically shaped peripheral surface, a plurality of chambers spaced about and set into the spherical surface of the stator in substantially a single plane at each major axis, an annular rotor surrounding the stator overlying the chambers in spaced relation thereto, an inner periphery on the rotor complementary to the exterior spherical surface of the stator, the rotor having flat sides parallel to the plane in which the chambers on the surface of the spherical stator lie, a plurality of chambers on each side of the rotor on the major axes open to the flat sides of the rotor and spaced slightly therefrom, a source of high-pressure fluid, a bleed-orifice for each of the aforementioned chambers, means to conduct a high-pressure fluid to the orifices, a pressure pick-off means from each one of the chambers surrounding the flat sides of the rotors through which a pressure in the chambers may be sensed.

References Cited in the file of this patent
UNITED STATES PATENTS
2,852,942   Gerard _____ Sept. 23, 1958